Aug. 27, 1968   J. S. CLEARY   3,398,614
METHOD OF AND APPARATUS FOR CUTTING JIGSAW PUZZLES
Filed Oct. 12, 1966
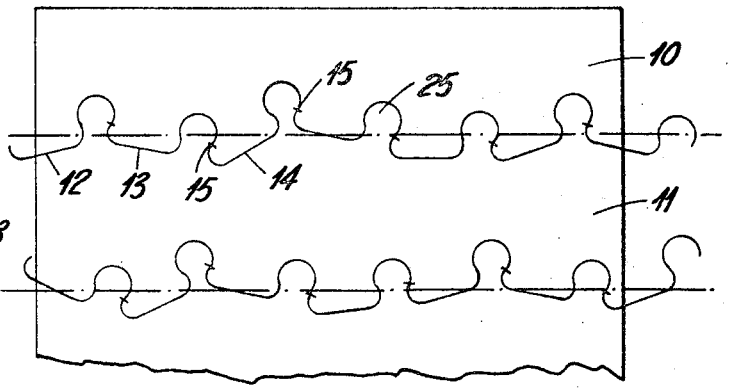
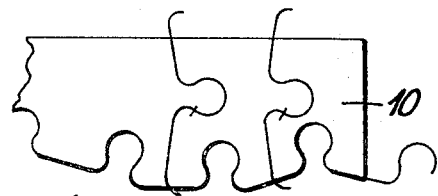
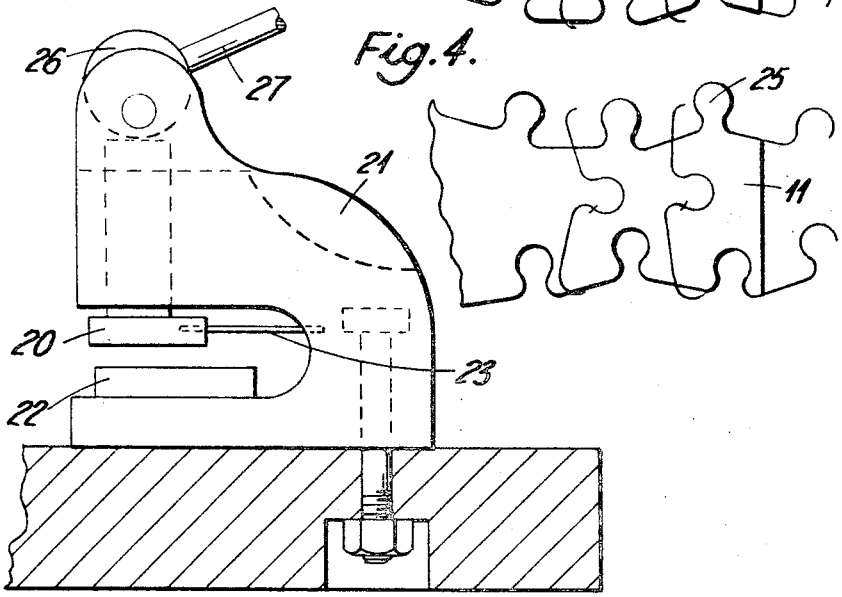
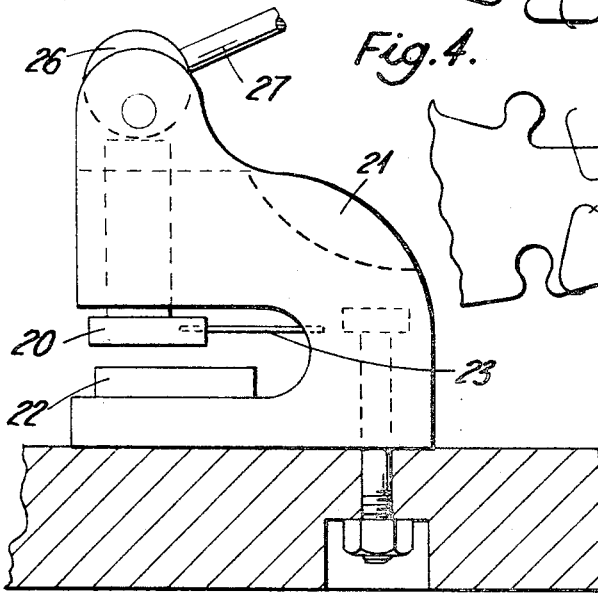
Inventor
James Sydney Cleary
By
Watson, Cole, Grindle + Watson
Attorneys United States Patent Office 3,398,614
Patented Aug. 27, 1968

3,398,614
METHOD OF AND APPARATUS FOR
CUTTING JIGSAW PUZZLES
James S. Cleary, Swalecliffe, Kent, England, assignor to Toogood & Jones Limited, Whitstable, Kent, England, a British company
Filed Oct. 12, 1966, Ser. No. 586,215
Claims priority, application Great Britain, Oct. 14, 1965, 43,584/65
11 Claims. (Cl. 83—32)

The invention relates to a tool and method for the cutting of jigsaw puzzles and particularly, but not exclusively, for the cutting of interlocking pieces of different shapes and sizes.

The invention provides a cutting tool for the above purpose which comprises a blade or strip curved about transverse axes to provide, like a letter S, two open-mouthed oppositely facing concave portions of which one, being longer than the other in the lengthwise direction of the blade, has a mouth wider than that of the other, one edge of the blade being sharpened to form a cutting edge.

Preferably the edge is sharpened by chamfering one face only of the blade, e.g. the face which is inside the wider mouth and outside the smaller.

The two concave portions may be of substantially equal depths.

The invention also provides the method of making a jigsaw puzzle which comprises cutting a sheet of card, or other material, into strips with irregular, preferably interlocking, edges using a cutting tool as above described, the tool being used in the cutting of each strip to make a succession of connected cuts and the orientation of the tool for different cuts being varied by angular movement of the tool about one end, and cutting the strips transversely into individual puzzle pieces, using the same or a generally similar tool.

Preferably the width of the strips in relation to the length of the tool is such that two transverse cuts are required to separate each piece, the orientation of the tool being varied.

The blade may be held in a holder (e.g. partly embedded by moulding or casting in a block of plastics material or metal) and it may be used as a punch or in a press.

A specific embodiment of the tool and its method of use will now be described, by way of example, with reference to the accompanying drawings in which:

FIGURE 1 shows the shape of the tool,

FIGURE 2 is a section through the tool showing the bevelled, sharpened, edge,

FIGURE 3 shows part of a card and how it is cut into strips,

FIGURE 4 shows how the strips are cut into pieces, and

FIGURE 5 shows a press.

The S-shape tool shown in FIGURES 1 and 2 is bent from spring steel, is hardened and tempered and is sharpened along one edge as shown. The opposite edge is embedded in a holder 28 as shown in FIGURE 2. The holder may be of metal or plastics material.

FIGURE 3 shows how the tool is used to cut a card, bearing a suitable picture, into strips 10 and 11. To cut each strip a succession of cuts 12, 13, 14, etc. is made, the cuts being connected at 15. The individual cuts, of course, correspond to the shape of the tool and when making the successive cuts the tool is turned slightly as between one cut and another about the points 15 (i.e. about one end of the tool).

After the card has been cut into strips, each strip is then cut transversely, as seen in FIGURE 4, into individual pieces. The strips are, preferably, cut with a width somewhat less than twice the length of the tool so that the pieces can be cut using two cuts which may be made at slightly different orientations of the tool.

FIGURE 5 shows the tool 20 mounted in a press body 21 moulded of plastics material. The press has an anvil 22 and a stripper pin or blade 23 which engages in the narrower mouth 24 of the tool to assist in ejection of the tongue 25. The press also has a cam 26 with a handle 27 for operating the tool.

If desired, the blade may be provided with a projecting pin at one end, and preferably each, end to assist in locating the blade for making connected cuts. When there is a pin at each end, a socket will be formed at the end of each cut into which the pin at the other end of the blade may be inserted when making the next cut.

As an alternative to the stripper pin 23, there may be a rubber pad held within the blade.

Several blades of varying dimensions may be used in the cutting of a single puzzle and they may be interchanged in the same press being held, for example, by screws.

I claim:

1. A jigsaw puzzle cutting tool consisting of a blade curved about transverse axes to provide, like a letter S, two open-mouthed oppositely facing concave portions of which one, being longer than the other in lengthwise direction of the blade, has a mouth wider than that of the other, one edge of the blade being sharpened to form a cutting edge.

2. A cutting tool as claimed in claim 1 in which the edge is sharpened by chamfering one face only of the blade.

3. A cutting tool as claimed in claim 1 in which the two concave portions are of substantially equal depths.

4. A cutting tool as claimed in claim 1 in which the other edge of the blade is embedded in a block forming a holder for the blade.

5. A method of making a jigsaw puzzle which comprises cutting a sheet of material into strips with irregular, interlocking, edges using a cutting tool consisting of a blade curved about transverse axes to provide, like a letter S, two open-mouthed oppositely facing concave portions of which one, being longer than the other in the lengthwise direction of the blade, has a mouth wider than that of the other, one edge of the blade being sharpened to form a cutting edge, the tool being used in the cutting of each strip to make a succession of connected cuts and the orientation of the tool for different cuts being varied by angular movement of the tool about one end, and cutting the strips transversely into individual puzzle pieces.

6. A method as claimed in claim 5 in which the tool therein described is used to cut the strips transversely into individual puzzle pieces.

7. A method as claimed in claim 5 in which the width of the strips in relation to the length of the tool is such that two transverse cuts are required to separate each piece, the orientation of the tool being varied.

8. A method as claimed in claim 5 in which the tool is held in a holder.

9. A method as claimed in claim 5 in which the tool is used as a punch.

10. A method as claimed in claim 5 in which the tool is used in a press.

11. A jigsaw puzzle cutting tool consisting of a blade curved about transverse axes to provide, like a letter S, two open-mouthed oppositely facing concave portions of substantially equal depths, of which one portion, being longer than the other in lengthwise direction of the blade has a mouth wider than that of the other, one edge of the blade being sharpened by chamfering on one face only to form a cutting edge, and the other edge of the blade being embedded in a block forming a holder for the blade.

References Cited

UNITED STATES PATENTS

| | | | |
|---|---|---|---|
| 841,798 | 1/1907 | MacMurray | 83—32 |
| 1,463,393 | 7/1923 | Heilman | 83—679 X |
| 1,666,204 | 4/1928 | Harshberger | 83—32 |

ANDREW R. JUHASZ, *Primary Examiner.*